United States Patent [19]

Ferguson

[11] 4,315,162
[45] Feb. 9, 1982

[54] RESERVE POWER SUPPLY FOR COMPUTERS

[75] Inventor: Frank T. Ferguson, Oklahoma City, Okla.

[73] Assignee: Control Technology, Incorporated, Oklahoma City, Okla.

[21] Appl. No.: 148,091

[22] Filed: May 9, 1980

[51] Int. Cl.³ .......................... H02J 7/00; H02J 9/00
[52] U.S. Cl. ...................................... 307/66; 307/71; 320/16; 365/229
[58] Field of Search ................... 307/66, 71; 320/16; 365/228, 229

[56] References Cited

U.S. PATENT DOCUMENTS

| 4,081,738 | 3/1978 | Roller | 307/71 |
| 4,143,283 | 3/1979 | Graf et al. | 307/66 |
| 4,232,377 | 11/1980 | Tallman | 365/229 |
| 4,255,697 | 3/1981 | Buhler | 365/229 |

FOREIGN PATENT DOCUMENTS

| 766414 | 8/1967 | Canada | 307/66 |
| 1266353 | 3/1972 | United Kingdom | 307/66 |

Primary Examiner—Russell E. Adams
Attorney, Agent, or Firm—E. Harrison Gilbert, III

[57] ABSTRACT

A reserve power supply for providing backup power to a computer system includes a first battery and a second battery which are switchably interconnected in series or parallel by a switch means. When the batteries are connected in parallel they may be charged by a primary power supply which normally drives the computer system. When the batteries are connected in series they provide power to the computer when the primary power supply fails. This association with the primary power supply and the computer system is effected by a coupling circuit of the reserve power supply. The reserve power supply further includes an indicator circuit which visually and audibly signals when the batteries are providing power to the computer system. The reserve power supply further includes an electrical circuit which connects the voltage from one of the batteries to a second voltage output of the primary power supply and a second voltage input of the computer system. This electrical circuit also converts the voltage from the one battery into a plurality of other voltages for use by the computer system.

23 Claims, 3 Drawing Figures

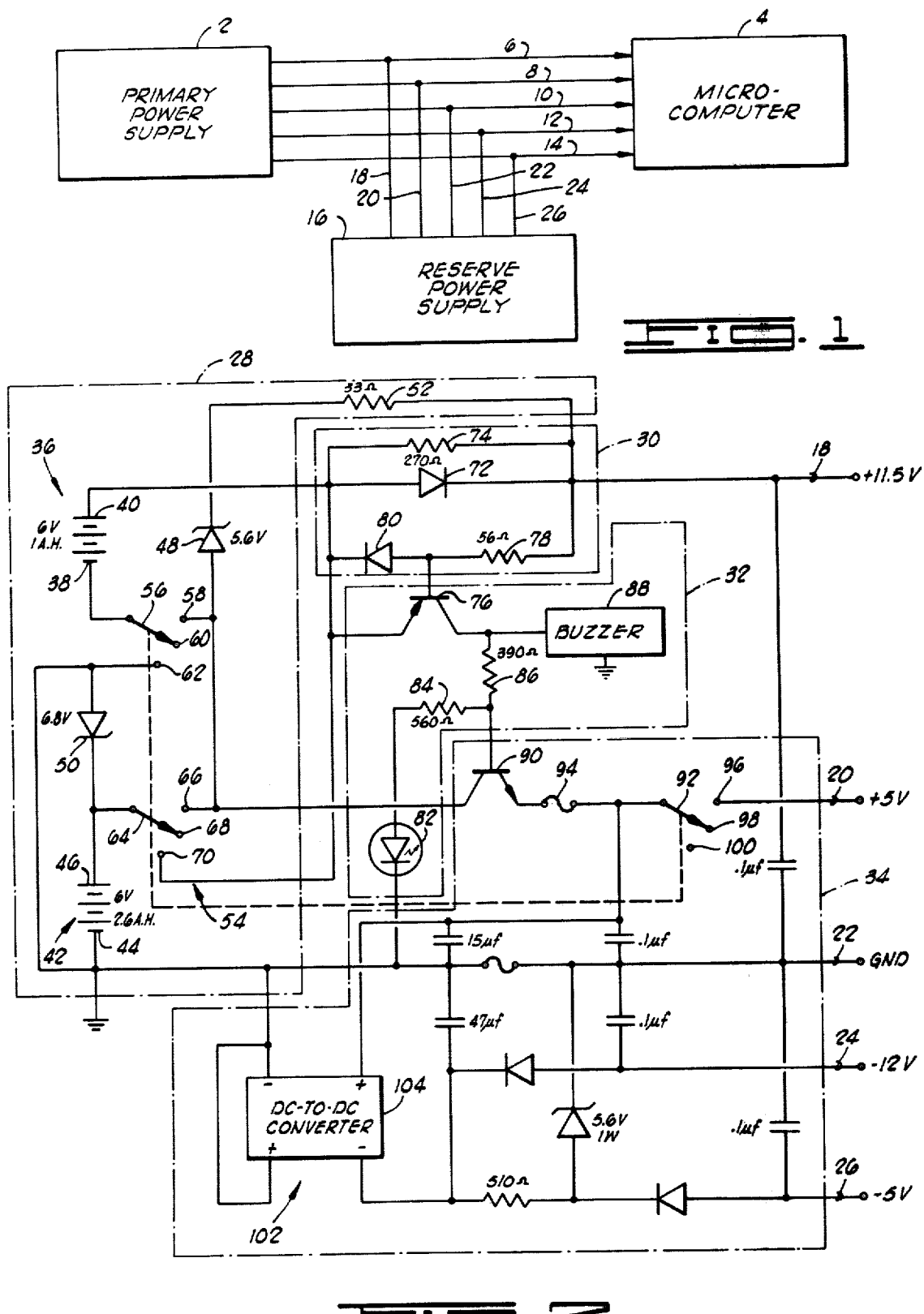

RESERVE POWER SUPPLY FOR COMPUTERS

BACKGROUND OF THE INVENTION

1. Field of the Invention

This invention relates generally to power supplies and more particularly, but not by way of limitation, to reserve power supplies for providing a backup to primary power supplies in computer systems.

2. Description of the Prior Art

One consideration which must be provided for in the utilization of electronic computers is the preservation of information when a power flicker, brownout, or outage occurs in the primary power supply of the computer system. To enable the computer to retain the information by transferring it to some type of permanent storage device during such a power failure, it is desirable to augment the primary power supply with a reserve power supply.

To provide a reserve power supply which is reliable enough to energize the computer for a sufficient time period during which the computer may effect necessary information transfers, it is necessary for the reserve power supply to be rechargeable during its operating mode so that it is retained in an electrically charged condition while it is standing by in readiness to power the computer when the primary power supply goes down. Furthermore, it is desirable that the reserve power supply be rechargeable at a faster rate when it is not in such a standby mode. Additionally, it is desirable for the reserve power supply to include means whereby the reserve supply may be disconnected from the primary power supply and the computer.

To reduce the chances of malfunctions and to improve the ease with which the power supply may be maintained, it is desirable that the reserve power supply have a simple construction and be easy to install. By having the features of simple construction and ease of installation, the reserve power supply can also be relatively economical as compared to more complex reserve power supplies.

So that the operator of the computer will know when the reserve power supply is standing by or when it is providing power to the computer, it is necessary to include means within the reserve power supply whereby audible and/or visual signals can be generated. Furthermore, there is the need to provide a plurality of voltage levels to the computer system when the primary supply fails.

That there is such a need for reserve power supplies is generally indicated in U.S. Pat. No. 4,143,283 in the name of Graf et al. This patent discloses a backup system which switches a bank of batteries from a series connection to a parallel connection a short time after the primary power supply fails. The batteries are connected in parallel to power the random access memories of the computer system within which the battery backup system is used.

Although the Graf et al. patent discloses one type of reserve power supply thereby indicating the need for such apparatus, I do not believe that it discloses a reserve power supply exhibiting the features of one constructed according to my invention as hereinbelow described. In particular, I believe that previously constructed or proposed devices have the shortcoming of failing to provide a relatively simply constructed reserve power supply which is simple to install and maintain, and is therefore relatively economical, and which provides backup power for all voltage levels needed by a computer to transfer necessary information to a permanent storage device, and also which can be operated and recharged in a standby mode with the batteries of the reserve power supply connected in series or can be more quickly recharged in a charge only mode with the batteries connected in parallel.

SUMMARY OF THE INVENTION

The present invention overcomes the above-noted and other shortcomings of the prior art by providing a novel and improved reserve power supply. This reserve power supply provides backup power to a computer at a plurality of voltage levels whereby the computer is enabled to transfer information to a permanent storage device for retention thereby until the primary power supply is restored. The present invention functions in an off mode or a standby mode wherein two batteries are connected in series or a charge only mode wherein the two batteries are connected in parallel. During the standby and charge only modes, the batteries can be recharged to maintain them electrically charged so that the reliability of the reserve power supply is enhanced.

The present invention is also simply constructed and simple to install so that malfunctions are minimized and maintenance is easier. Such construction also makes the reserve power supply of the present invention relatively economical to obtain and use.

Furthermore, the present invention includes means for providing audible and visual indicator signals to notify personnel of the status of the reserve power supply.

Broadly, the reserve power supply constructed in accordance with the present invention includes a first source of electrical energy and a second source of electrical energy. Also included in the present invention is switch means for connecting the first source in electrical series with the second source when the switch means is in a first selectable state and for connecting the first source in electrical parallel with the second source when the switch means is in a second selectable state. The present invention further includes coupling means for coupling the first and second sources to a first output of a primary power supply so that the sources provide electrical power to a load connected to the primary power supply when the sources are connected in series and the voltage at the first output of the primary power supply is a predetermined amount below a first voltage output of the serially connected first and second sources and so that the primary power supply provides a charging current to the first and second sources when the sources are connected in electrical parallel.

The reserve power supply further comprises indicator means for generating a signal indicating when the first and second sources are providing electrical power to the load connected to the primary power supply. The indicator means includes a visual display means for displaying a first intensity level of light when the sources are connected in series and the voltage at the first output of the primary power supply is less than the predetermined amount below the first voltage output of the serially connected sources and for displaying a second intensity level of light when the sources are connected in series and the voltage at the first output of the primary power supply is the predetermined amount below the first voltage output of the serially connected sources. The indicator means further includes an audio signaling means for generating an audible signal when the sources are connected in series and the voltage at the first output of the primary power supply is the predetermined amount below the first voltage output of the serially connected sources.

The reserve power supply of the present invention also comprises means for providing a plurality of other voltages to loads connected to the primary power supply when the sources are connected in series and the voltage at the first output of the primary power supply is the predetermined amount below the first voltage output of the serially connected sources.

From the foregoing, it is a general object of the present invention to provide a novel and improved reserve power supply. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 1 is a block diagram depicting the reserve power supply of the present invention in association with a primary power supply and a microcomputer system.

FIG. 2 is a schematic circuit diagram of a preferred embodiment of the reserve power supply of the present invention.

DETAILED DESCRIPTION OF PREFERRED EMBODIMENTS OF THE INVENTION

Figure 3:
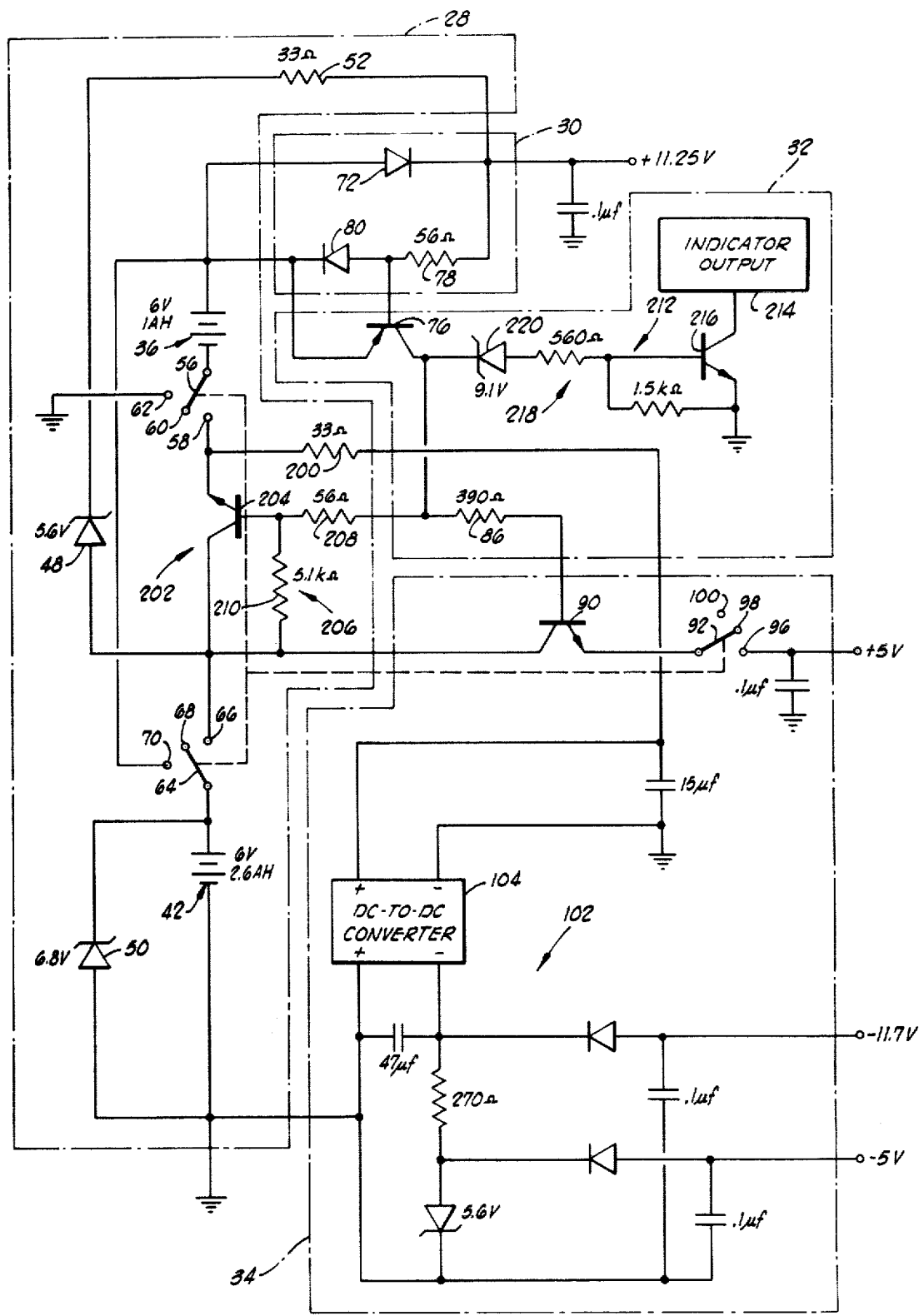
FIG. 3 is a schematic circuit diagram of another preferred embodiment of the reserve power supply of the present invention.

With reference now to the drawings the preferred embodiments of a reserve power supply supply constructed in accordance with the present invention will be described.

FIG. 1 discloses a block diagram representing a primary power supply 2 connected to a computer, and in particular to a microcomputer system 4, to provide power thereto at a plurality of voltages as represented by lines 6, 8, 10, 12, and 14. A reserve power supply 16 constructed in accordance with the present invention is connected in parallel with the primary power supply 2 as represented by lines 18, 20, 22, 24 and 26.

The primary power supply 2 is any suitable type of power supply for providing normal service to the microcomputer 4. For example, the supply 2 may include an alternating current source, a transformer, a full-wave rectifier and appropriate voltage regulators to provide the requisite voltages used by the microcomputer 4.

The computer which is normally driven by the primary power supply 2 and is powered by the reserve power supply 16 when the primary supply 2 suffers a power flicker, brown-out, outage or other malfunction is, as previously stated, a microcomputer in the preferred embodiment and includes the appropriate central processing memory and peripheral elements as known in the art. In particular, the computer may be the system known as the Apple II computer which is marketed by Apple Computer, Inc. With this particular computer the voltages which are to be provided over lines 6–14 are nominally approximately +12.0 volts, +5 volts, system ground, −5 volts and −12 volts.

With reference to FIG. 2, a first preferred embodiment of the reserve power supply 16 as constructed in accordance with the present invention will be described. FIG. 2 indicates that the preferred embodiment shown therein includes a backup power source means 28, a coupling means 30, an indicator means 32, and means for providing a plurality of other voltages, as generally designated by the reference numeral 34.

The backup power source means 28 includes a first source of electrical energy which is preferrably a D.C. source such as a first battery 36. The first battery 36 includes a negative terminal 38 and a positive terminal 40. The backup power source means 28 also includes a second source of electrical energy which is also preferrably a D.C. source such as a second battery 42. The second battery 42 has a negative terminal 44, which is shown connected to a system ground or reference, and a positive terminal 46. As shown in FIG. 2, associated with the first and second batteries 36 and 42 are a first Zener diode 48 and a second Zener diode 50, respectively, and a resistor 52. The Zener diodes 48 and 50 limit the maximum voltage which may be input to the batteries, and the Zener diode 48 and the resistor 52 permit a charging current to pass therethrough when the second battery 42 is serially connected to the first battery 36. As indicated in FIG. 2 the nominal voltage of each of the batteries is six volts.

The backup power source means 28 further includes a switch means, generally indicated by the reference numeral 54, for connecting the first source of electrical energy in electrical series with the second source of electrical energy when the switch means 54 is in a first selectable state and for connecting the first source of electrical energy in electrical parallel with the second source of electrical energy when the switch means 54 is in a second selectable state. In the preferred embodiment shown in FIG. 2, the switch means 54 includes a tandem switch having a first wiper arm 56 electrically connected to the negative terminal 38 of the first battery 36 and movably mounted within the tandem switch to switchably coact with a first contact terminal 58, a second contact terminal 60 and a third contact terminal 62. The third contact terminal 62 is shown electrically connected to the anode of the Zener diode 50 and to the negative terminal 44 of the second battery 42. The tandem switch also includes a second wiper arm 64 electrically connected to the positive terminal 46 of the second battery 42 and movably mounted within the tandem switch for synchronous movement with the first wiper arm 56 to switchably coact with a fourth contact terminal 66 which is electrically connected to the first contact terminal 58, and to also switchably coact with a fifth contact terminal 68 and with a sixth contact terminal 70 which is connected to the positive terminal 40 of the first battery 36. For the tandem switch shown in FIG. 2 the synchronous movement of the second wiper arm 64 with the first wiper arm 56 may be achieved by ganging or mechanically interconnecting the wiper arms. The switch means 54 of the FIG. 2 embodiment is manually operable.

When the switch means 54 is manually operated so that the wiper arms 56 and 64 coact with the terminals 58 and 66, respectively, whereby a first state or position of the switch 54 is defined, the switch means 54 provides means for directly connecting the negative terminal 38 of the first battery 36 to the positive terminal 46 of the second battery 42 to establish a first voltage of the reserve power supply 16 at the positive terminal 40 of the first battery 36. For the batteries 36 and 42 having nominal voltage ratings of six volts, this first voltage would be nominally twelve volts when the batteries are fully charged. When the switch means 54 is placed in a second state or position as defined by the wiper arms 56 and 64 being placed in coaction with the third and sixth contact terminals 62 and 70, respectively, the switch means 54 provides means for connecting the positive terminal 40 of the first battery 36 to the positive terminal 46 of the second battery 42 and connecting the negative terminal 38 of the first battery 36 to the negative terminal 44 of the second battery 42. It is to be noted that the second contact terminal 60 and the fifth contact terminal 68 are open so that the reserve power supply is in an "off" state when the wiper arms 56 and 64 coact with these two terminals.

The coupling means 30 couples the first and second sources of electrical energy to a first output of the primary power supply. In the FIG. 2 embodiment the coupling means 30 couples the batteries 36 and 42 to the nominal +12.0 volt output of the primary power supply 2 and the corresponding voltage input of the microcomputer system 4. This coupling is established so that when the sources of the backup power source means 28 are connected in series and when the voltage at the first output of the primary power supply 2 is a predetermined amount below the first voltage output of the serially connected first and second sources of electrical energy, the sources of electrical energy provide electrical power to the load presented by the microcomputer system 4 connected to the primary power supply 2. The predetermined amount by which the voltage at the first output of the primary power supply 2 must be below the first voltage provided by the serially connected first and second sources of the backup power source means 28 before these sources will provide power to the microcomputer 4 is established by the voltage drop across a diode 72. This operation will be more particularly described hereinbelow with respect to the operation of the FIG. 2 embodiment of the present invention.

The coupling means 30 also couples the sources of electrical energy to the primary power supply 2 so that the primary power supply 2 provides a charging current to the first and second sources when these sources are connected in electrical parallel by the switch means 54. Whenever the voltage at the first output of the primary power supply 2 is greater than the voltage provided by the first and second sources of the backup power source means 28, the primary power supply 2 charges the sources through a resistor 74 shown connected in electrical parallel across the diode 72 with the anode end of the diode connected to one end of the resistor 74 and to the positive terminal 40 of the first battery 36 and with the cathode end of the diode 72 connected to the other end of the resistor 74 and to the first output of the primary power supply 2. Charging also occurs through a resistor 78 and a diode 80 whenever the appropriate voltage drop across the diode 80 is present. The resistor 78 and the diode 80 are connected in series with each other and in parallel with the diode 72 and the resistor 74. Charging of the second battery 42 also can occur through the resistor 52 and the diode 48.

Therefore, for the FIG. 2 embodiment, when the switch means 54 is in a first state or position as defined by the wiper arms 56 and 64 coacting with terminals 58 and 66, respectively, the positive terminal 40 of the first battery 36 is coupled to the first output of the primary power supply 2 so that the first and second batteries 36 and 42 provide electrical power to the microcomputer 4 when the voltage at the first output of the primary power supply 2 is the predetermined amount below the first voltage established by the serially connected batteries. When the switch means 54 is in its second state as defined by the wiper arms 56 and 64 coacting with the terminals 62 and 70, respectively, the positive terminals 40 and 46 of both the first and second batteries 36 and 42 are coupled to the first output of the primary power supply 2 so that the primary power supply 2 provides a charging current to the first and second battery.

The indicator means 32 functions to generate a signal indicating when the first and second sources of the backup power source 28 are providing electrical power to the load connected to the primary power supply 2. FIG. 2 discloses that the indicator means 32 includes a switch means which is responsive to the status of the relationship between the voltage at the first output of the primary power supply 2 and the first voltage output of the serially connected sources of electrical energy. This switch means includes a first transistor 76 having its base connected to the resistor 78 and the diode 80 as shown in FIG. 2 whereby the transistor 76 is connected to the coupling means 30.

Connected to the collector of the transistor 76 is a visual display means for displaying a first intensity level of light when the sources, such as the batteries 36 and 42, are connected in series and the voltage at the first output of the primary power supply 2 is less than the predetermined amount below the first voltage output of the serially connected sources and for displaying a second intensity level of light when the sources are connected in series and the voltage at the first output of the primary power supply 2 is at least the predetermined amount below the first voltage output of the serially connected sources. FIG. 2 shows the visual display means includes a light-emitting diode 82 which is coupled to the collector of the transistor 76 through a resistor 84 and a resistor 86.

The indicator means 32 further includes an audio signaling means for generating an audible signal when the sources of the backup power source means 28 are connected in series and the voltage at the first output of the primary power supply is the predetermined amount below the first voltage output of the serially connected sources. That is, an audible signal is provided when the serially connected sources are energizing the load presented by the microcomputer 4. The audio signaling means is preferrably a sound generating member such as a buzzer 88 of the type sold under the name Sonalert. As shown in FIG. 2, the buzzer 88 is also connected to the collector of the transistor 76.

The preferred embodiment of the reserve power supply 16 as shown in FIG. 2 also includes the means 34 for providing a plurality of other voltages to loads, such as the microcomputer 4, connected to the primary power supply 2 when the sources of the backup power source means 28 are connected in series and the voltage at the first output of the primary power supply 2 is the predetermined amount below the first voltage output by the serially connected sources. As shown in FIG. 2, the means 34 includes another switch means which is responsive to the occurrence of this condition whereby the reserve power supply 16 is energizing the load as represented by the microcomputer 4. In particular, this switch means includes a second transistor 90 which has its base input connected to the junction of the resistors 84 and 86 whereby the transistor 90 responds to the switching of the transistor 76 which in turn responds to the occurrence of the condition wherein the batteries 36 and 42 are energizing the microcomputer 4. This switch means further includes a third wiper arm 92 connected to the emitter of the transistor 90 through a fuse 94 and ganged or mechanically connected to the first and second wiper arms 56 and 64 for synchronous movement therewith. As the wiper arm 92 is synchronously moved with the wiper arms 56 and 64, the wiper arm 92 coacts with a seventh contact terminal 96, an eighth contact terminal 98, and a ninth contact terminal 100. As shown in FIG. 2, the seventh terminal 96 is connected to a second output of the primary power supply 2, such as the +5 volt output. The terminals 98 and 100 are open. This switch means thereby switchably connects the positive terminal 46 of the second battery 42 to the second output of the primary power supply 2 when the first and second batteries are connected in series and the voltage of the first output of the power supply 2 is the predetermined amount below the first voltage output by the serially connected batteries whereby the batteries are energizing the microcomputer 4.

The means 34 further includes voltage converter means, generally indicated by the reference numeral 102, for converting the voltage level at the positive terminal 46 of the second battery 42 (less the transistor 90 voltage drop) to a plurality of other voltage levels and for supplying the other voltage levels to the load, such as the microcomputer 4, connected to the primary power supply 2. As shown in FIG. 2, the voltage converter means 102 includes a DC-to-DC converter means 104 of the type as is known in the art and a plurality of capacitors and diodes connected as shown in FIG. 2 to establish the necessary other voltage levels. For the preferred embodiment shown in FIG. 2 to be used with such a computer as the Apple II system, these other voltages include the −5 volt and −12 volt levels, along with the +5 volt level previously mentioned.

Having thus described the structure of the preferred embodiment circuit of the present invention as shown in FIG. 2, the operation thereof will be described. With the wiper arms 56, 64 and 92 placed in contact with the terminals 60, 68, and 98, respectively, as shown in FIG. 2, the reserve power supply 16 is in its "off" mode. With the wiper arms placed in this position, the reserve power supply is neither supporting the microcomputer 4 nor being charged by the primary power supply 2.

When the wiper arms 56, 64, and 92 are positioned to contact the terminals 62, 70, and 100, respectively, the reserve power supply 16 is in its "charge only" mode. In this mode the batteries 36 and 42 are connected in parallel and thus establish at the junction of the parallel connected batteries and the coupling means 30 a nominal maximum charged voltage of approximately six volts for the type of batteries shown in FIG. 2. When the voltage at the first output of the primary power supply 2 is greater than the voltage presented by the parallel-connected batteries (as it is during normal operation because it is nominally at approximately +12.0 volts) the primary power supply 2 charges the two batteries 36 and 42 through the resistor path and the resistor 78-diode 80 path. Because the maximum voltage of the parallel-connected batteries is nominally approximately +6 volts and is limited to a maximum of +6.8 volts by the Zener diode 50, the reserve power supply 16 is unable to support the microcomputer 4 with such a low voltage should the primary power supply 2 fail while the reserve power supply 16 is in its "charge only" mode.

To support the microcomputer 4, or other load which may be connected to the primary power supply 2, when the power supply 2 fails, the wiper arms 56, 64, and 92 must be placed in contact with the terminals 58, 66 and 96, respectively. When the wiper arms are in this position, the reserve power supply 16 is in its "on/standby" mode wherein the batteries 36 and 42 are connected in series to establish a first voltage output of nominally approximately +12 volts at the positive terminal 40 of the battery 36 when the batteries are of the type indicated in FIG. 2. If the serially connected batteries are at a lower voltage than is present at the first output of the primary power supply 2 (i.e., the +12.0 volt output for the embodiment shown in FIGS. 1–2), then the primary power supply 2 trickle charges the serially connected batteries through the resistor 74 and, if the appropriate voltage drops are present, through the resistor 78 and the diode 80 and the resistor 52 and the diode 48. Although the batteries may be charged in this mode, they are also standing by to power the microcomputer 4 should the primary power supply 2 go down.

The serially connected batteries 36 and 42 power the microcomputer 4 when the voltage at the first output of the primary power supply 2, i.e., the nominal +12.0 volt output, is the predetermined amount below the first voltage provided by the serially connected batteries, i.e., the voltage at the positive terminal 40 of the battery 36. This predetermined amount is determined by the diode 72 voltage drop which must be attained before the diode switches to its current conductive state. When the voltage at the first output of the primary power supply 2 does drop this predetermined amount below the voltage level at the positive terminal 40, the diode 72 becomes conductive and maintains its cathode, and consequently the first output of the primary power supply 2 and the microcomputer 4 input connected thereto, at a voltage which is equal to the first voltage established by the serially connected batteries 36 and 42 at the positive terminal 40 minus the voltage drop across the diode 72.

When the batteries 36 and 42 are connected in series, but are merely standing by and not providing power to the microcomputer 4, there is a relatively low voltage on the collector of the transistor 76 so that the diode 82 is illuminated at a first intensity level of light. When the serially connected batteries are providing power to the microcomputer 4 during that period when the voltage at the first output of the primary supply 2 is the predetermined amount below the voltage established by the serially connected batteries, the transistor 76 is switched on whereby a higher voltage is present at the collector thereof to more brightly illuminate the light-emitting diode 82 to a second intensity level of light which is greater than the first intensity level. When the transistor 76 is switched on, the buzzer 88 is also activated to provide an audible signal.

The switching of the transistor 76 also causes the transistor 90 to become conductive so that the nominal +6 volt output at the positive terminal 46 of the second battery 42 is connected through the transistor 90 to the +5 volt output of the primary power supply 2 and the corresponding input of the microcomputer 4. The voltage at the positive terminal 46 of the second battery 42 is also provided through the transistor 90 to the input of the DC-to-DC converter 104 for conversion thereby to the other necessary voltages utilized by the microcomputer 4. These other voltages are shown to be the nominal −5 volt and −12 volt levels provided using the indicated circuit components of FIG. 2.

Therefore, it is apparent that when the reserve power supply 16 is placed in its "on/stand-by" mode, it provides the necessary power at the appropriate time to the microcomputer 4 to permit the microcomputer to continue functioning for the life of a sufficient charge of the serially connected batteries 36 and 42 whereby the microcomputer can transfer volatile information to a permanent storage medium such as a disk or cassette. For example, when the reserve power supply constructed in accordance with the present invention is used with a 48K Apple II computer having an integer card, printer interface and disk controller card with two drives associated therewith, the reserve power supply provides approximately fifteen minutes of continuous backup to accomplish the necessary information retention steps. Furthermore, when the preferred embodiment shown in FIG. 2 is used with the above Apple II system, the reserve power supply has the recharging characteristics of approximately thirty to thirty-six hours in the "on/-stand-by" mode and approximately ten to eleven hours in the "charge only" mode.

FIG. 3 discloses a second embodiment of the reserve power supply constructed in accordance with the present invention. It will be noted that several of the elements in the FIG. 3 embodiment are identical to corresponding elements in FIG. 2 as indicated by the like reference numerals. However, there are some differences between the FIG. 2 and FIG. 3 embodiments.

One difference is that the FIG. 3 embodiment includes a resistor 200 which connects the negative terminal of the first battery 36 to the nominal +5 volt output of the primary power supply when the third wiper arm 92 is in contact with terminal 96.

The FIG. 3 embodiment also includes an electronic switch means 202 for automatically completing the connecting of the second battery 42 in series with the first battery 36 when the first wiper arm 56 is in contact with the terminal 58 and the second wiper arm 64 is in contact with the terminal 66 and also when the reserve power supply is to provide power to the computer system. The electronic switch means 202 includes a transistor 204 having its collector connected to the terminal 66 and having its emitter connected to the terminal 58 of the manually operable, mechanical tandem switch. The base of the transistor 204 is connected to a resistor network 206 including a resistor 208 and a resistor 210 connected as shown in FIG. 3.

Another distinction between the FIG. 2 and FIG. 3 embodiments is that the FIG. 3 embodiment coupling means 30 does not include the resistor 74.

A further distinction is that the indicator means 32 of the FIG. 3 embodiment includes a drive circuit, identified generally by the reference numeral 212, which is different from the one in the FIG. 2 embodiment. In particular, the drive circuit 212 includes an indicator output 214, such as a light emitting diode and/or a buzzer, which is actuated in response to the switching of a switching transistor 216. Connected to the transistor 216 is a resistor network 218. Connecting the resistor network 218 to the collector of the transistor 76 is a Zener diode 220.

The structural differences between the FIG. 2 and FIG. 3 embodiments give rise to operational differences between the two. One operational difference is that the first voltage, below which the voltage at the first output of the primary supply 2 must drop before the reserve power supply takes over to drive the computer system, is established by the voltage of the first battery 36 and the voltage at the second output of the primary power supply (the nominal +5 output in FIG. 3). Therefore, for the values shown in FIGS. 2 and 3, the first voltage of the FIG. 2 embodiment is nominally approximately twelve volts, whereas the first voltage in the FIG. 3 embodiment is nominally approximately eleven volts. This distinction keeps the FIG. 3 embodiment from triggering during temporary shortfalls of the primary power supply 2 which may occur during normal computer functions such as accessing a disk drive and thereby drawing a relatively higher current and causing the often unregulated voltage at the first output of the primary power supply to momentarily decrease. This different between the levels of the first voltages between the first and second embodiments is achieved through the use of the resistor 200 and the electronic switch means 202.

The electronic switch means 202 isolates the second battery 42 from the first battery 36 during the on/-standby mode until the voltage at the first output of the primary power supply drops the predetermined amount below the above-discussed first voltage. When this drop occurs, the transistor 204 is switched on to thereby couple the two batteries 36 and 42 together so that the requisite voltage can be used to energize the computer during the outage or other failure of the primary power supply 2. The resistor 210 is used to increase the turn-on speed of the FIG. 3 embodiment and to prevent the reserve power supply from providing power to a short-circuited load which might occur with various crowbar circuits contained in primary power supplies used with computer systems as known in the art.

Although the FIG. 3 embodiment effects the serial connection between the first and second batteries by a second embodiment of the switch means 54 which is different from the first embodiment of the switch means 54 shown in FIG. 2, the FIG. 3 embodiment still permits the first battery 36 and the second battery 42 to be trickle charged during the on/standby mode. The charging current is communicated to the first battery 36 through the resistor 78 and the diode 80 when the appropriate conditions are present and to the second battery 42 through the resistor 52 and the Zener diode 48 in like manner to the operation of the FIG. 2 embodiment. Through the use of the resistor 200 and the electronic switch means 202 in the FIG. 3 embodiment, the batteries 36 and 42 may be charged to a higher level so that the time that the reserve power supply can provide power to the computer system during primary power supply outages or other failures is increased.

Although the drive circuit 212 of the indicator means 32 of the FIG. 3 embodiment is structurally different from the embodiment thereof shown in FIG. 2, the operation is the same in that when the reserve power supply provides power to the computer system, the transistor 76 becomes fully conducting which provides a current to the base of the transistor 216 to thereby switch the transistor 216 on and actuate the indicator output means 214. The indicator output means 214 can include, for example, a light emitting diode having its anode connected to an appropriate voltage level and having its cathode connected to the collector of the transistor 216 so that the cathode is pulled to ground when the transistor 216 is switched on whereby the light emitting diode is illuminated to indicate that the reserve power supply is supporting the computer system. The output means 214 can further include a sound generating device which is similarly activated to indicate that the reserve power supply is supporting the computer.

Despite the structural differences set forth above, the embodiment disclosed in FIG. 3 still meets the needs which are desirable for a reserve power supply.

Thus, the present invention of a reserve power supply is well adapted to carry out the objects and attain the ends and advantages mentioned above as well as those inherent therein. While preferred embodiments of the invention have been described for the purpose of this disclosure, numerous changes in the construction and arrangement of parts can be made by those skilled in the art, which changes are encompassed within the spirit of this invention as defined by the appended claims. For example, the specific parameters for the components shown in FIGS. 2-3 are illustrative of the values for the preferred embodiments of the invention and are not to be taken as limiting other values or ranges of values which may be used.

What is claimed is:

1. A power supply comprising:
   a first source of electrical energy;
   a second source of electrical energy;
   switch means for connecting said first source in electrical series with said second source when said switch means is in a first selectable state and for connecting said first source in electrical parallel with said second source when said switch means is in a second selectable state; and
   coupling means for coupling said first and second sources to a first output of a primary power supply so that said sources provide electrical power to a load connected to the primary power supply when said sources are connected in series and the voltage at the first output of said primary power supply is a predetermined amount below a first voltage output of said serially connected first and second sources and so that the primary power supply provides a charging current to said first and second sources when said sources are connected in electrical parallel.

2. A power supply as recited in claim 1, further comprising indicator means for generating a signal indicating when said first and second sources are providing electrical power to the load connected to the primary power supply.

3. A power supply as recited in claim 2, wherein said indicator means includes a visual display means for displaying a first intensity level of light when said sources are connected in series and the voltage of the first output of the primary power supply is less than the predetermined amount below the voltage output of said serially connected sources and for displaying a second intensity level of light when said sources are connected in series and the voltage at the first output of the primary power supply is the predetermined amount below the first voltage output of said serially connected sources.

4. A power supply as recited in claim 3, wherein said indicator means further includes an audio signaling means for generating an audible signal when said sources are connected in series and the voltage at the first output of the primary power supply is the predetermined amount below the first voltage output of said serially connected sources.

5. A power supply as recited in claim 1, further comprising means for providing a plurality of other voltages to loads connected to the primary power supply when said first and second sources are connected in series and the voltage at the first output of the primary power supply is the predetermined amount below the first voltage output by said serially connected sources.

6. A power supply as recited in claim 5, further comprising indicator means for generating a signal indicating when said first and second sources are providing electrical power to the load connected to the primary power supply.

7. A power supply as recited in claim 6, wherein said indicator means includes a visual display means for displaying a first intensity level of light when said sources are connected in series and the voltage at the first output of the primary power supply is less than the predetermined amount below the first voltage output of said serially connected sources and for displaying a second intensity level of light when said sources are connected in series and the voltage at the first output of the primary power supply is the predetermined amount below the first voltage output of said serially connected sources.

8. A power supply as recited in claim 7, wherein said indicator means further includes an audio signaling means for generating an audible signal when said sources are connected in series and the voltage at the first output of the primary power supply is the predetermined amount below the first voltage output of said serially connected sources.

9. A reserve power supply for providing auxiliary power to a computer, which computer is normally energized by a primary power supply, when the voltage at a first output of the primary power supply is a predetermined amount below a first voltage of said reserve power supply, said reserve power supply comprising:
    a first battery having a negative terminal and a positive terminal;
    a second battery having a negative terminal and a positive terminal;
    first switch means for connecting the negative terminal of said first battery to the positive terminal of said second battery when said switch means is in a first state and for both connecting the positive terminal of said first battery to the positive terminal of said second battery and connecting the negative terminal of said first battery to the negative terminal of said second battery when said switch means is in a second state; and
    coupling means for coupling the positive terminal of said first battery to the first output of the primary power supply when said switch means is in the first state so that said first and second batteries provide electrical power to the computer when the voltage at the first output of the primary power supply is the predetermined amount below the first voltage and for coupling the positive terminals of said first and second batteries to the first output of the primary power supply when said switch means is in the second state so that the primary power supply provides a charging current to said first and second batteries.

10. A reserve power supply as recited in claim 9, further comprising indicator means for generating a signal indicating when said first and second batteries are providing electrical power to the computer.

11. A reserve power supply as recited in claim 10, wherein said indicator includes:
    a transistor connected to said coupling means;

a light-emitting diode connected to said transistor; and a sound generating member connected to said transistor.

12. A reserve power supply as recited in claim 9, further comprising means for providing a plurality of other voltages to the computer when said first and second batteries are connected in series and the voltage of the first output of the primary power supply is the predetermined amount below the first voltage.

13. A reserve power supply as recited in claim 12, wherein said means for providing a plurality of other voltages includes:
 a second switch means for switchably connecting the positive terminal of said second battery to a second output of the primary power supply when said first and second batteries are connected in series and the voltage of the first output of the primary power supply is the predetermined amount below the first voltage output by said serially connected batteries; and
 voltage converter means, connected to said second switch means, for converting the voltage level at the positive terminal of said second battery to a plurality of other voltage levels and for supplying the other voltage levels to the computer.

14. A reserve power supply as recited in claim 9, wherein said coupling means includes:
 a first resistor;
 a first diode having an anode end connected to a first end of said first resistor and further having a cathode end; and
 a second diode having an anode end connected to the cathode end of said first diode and to the positive terminal of said first battery and further having a cathode end connected to a second end of said first resistor and to the first output of the primary power supply.

15. A reserve power supply as recited in claim 14, wherein said coupling means further includes a second resistor connected in parallel across said second diode.

16. A reserve power supply as recited in claim 9, wherein said switch means includes a tandem switch having a first wiper arm electrically connected to the negative terminal of said first battery and movably mounted within said tandem switch to switchalby coact with a first contact terminal, a second contact terminal and a third contact terminal, which third contact terminal is electrically connected to the negative terminal of said second battery, and said tandem switch also having a second wiper arm electrically connected to the positive terminal of said second battery and movably mounted within said tandem switch for synchronous movement with the first wiper arm to switchably coact with a fourth contact terminal, which fourth contact terminal is electrically connected to the first contact terminal, and to switchably coact with a fifth contact terminal and a sixth contact terminal, which sixth contact terminal is electrically connected to the positive terminal of said first battery.

17. A reserve power supply as recited in claim 16, wherein said coupling means includes:
 a first resistor;
 a first diode having an anode end connected to a first end of said first resistor and further having a cathode end; and
 a second diode having an anode end connected to the cathode end of said first diode and to the positive terminal of said first battery and further having a cathode end connected to a second end of said first resistor and to the first output of the primary power supply.

18. A reserve power supply as recited in claim 17, wherein said coupling means further includes a second resistor connected in parallel across said second diode.

19. A reserve power supply as recited in claim 16, further comprising indicator means for generating a signal indicating when said first and second batteries are providing electrical power to the computer.

20. A reserve power supply as recited in claim 19, wherein said indicator means includes:
 a transistor connected to said coupling means;
 a light-emitting diode connected to said transistor; and
 a sound generating member connected to said transistor.

21. A reserve power supply as recited in claim 19, wherein said means for providing a plurality of other voltages includes:
 a second switch means for switchably connecting the positive terminal of said second battery to a second output of the primary power supply when said first and second batteries are connected in series and the voltage of the first output of the primary power supply is the predetermined amount below the first voltage; and
 voltage converter means, connected to said second switch means, for converting the voltage level at the positive terminal of said second battery to a plurality of other voltage levels and for supplying the other voltage levels to the computer.

22. A reserve power supply as recited in claim 9, wherein said first switch means includes a manually operable switch for directly connecting the negative terminal of said first battery to the positive terminal of said second battery so that the first voltage is established by the addition of the voltages of said first and second batteries.

23. A reserve power supply as recited in claim 9, wherein said first switch means includes:
 means for connecting the negative terminal of said first battery to a second output of the primary power supply to establish the first voltage; and
 an electronic switch means for electrically coupling the negative terminal of said first battery to the positive terminal of said second battery when the voltage at the first output of the primary power supply is the predetermined amount below the first voltage established by the voltage of said first battery and the voltage of the second output of the primary power supply.

* * * * *